Patented Aug. 8, 1933

1,921,360

UNITED STATES PATENT OFFICE 1,921,360

MIXTURES OF NEW ISOMERIC DYESTUFFS AND PROCESS OF PREPARING THEM

Georg Kränzlein, Heinrich Greune, Martin Corell, and Heinrich Vollmann, Frankfort - on - the - Main-Hoechst, Germany, assignors to General Aniline Works, Inc., New York, N. Y., a Corporation of Delaware No Drawing. Application July 23, 1931, Serial No. 552,790, and in Great Britain March 23, 1928

14 Claims. (Cl. 260—44)

Our present invention relates to mixtures of new isomeric dyestuffs and to processes of preparing them.

This application contains subject matter in common with our application Serial No. 342,662 filed February 25, 1929.

We have found that the condensation products of an aromatic ortho-diamine compound with a benzenthrone-peri-dicarboxylic anhydride of the following general formula:

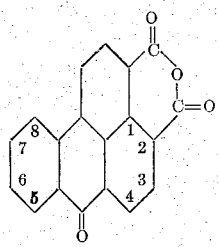

wherein the nuclei may contain substituents and a further benzene nucleus may be condensed in 5.6- or 7.8-position are valuable vat dyestuff mixtures of good fastness properties.

Chemically these condensation products are imidazol derivatives which are formed from the anhydride of a benzanthrone peri-dicarboxylic acid and an ortho-diamine by elimination of water. The condensation may be effected by heating the components either per se or in the presence of a diluent to a temperature exceeding 80° C. up to the boiling- or melting temperature of the reaction mixture. The reaction, for instance, takes the following course:

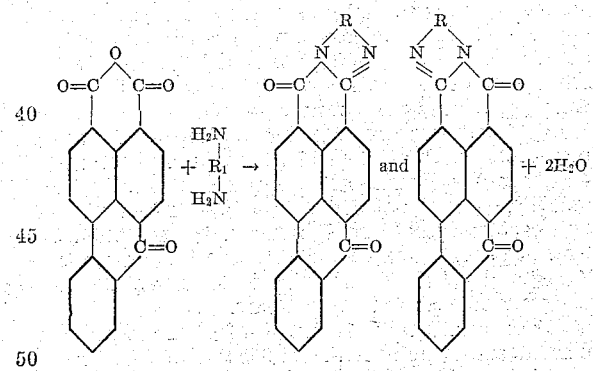

In the preceding formulæ R stands for a substituted or unsubstituted aromatic radical in which the two amino groups are in ortho-position to one another.

According to the present invention the condensation products are obtained in the form of mixtures of isomeric dyestuffs as shown by the above equation.

As diluents there may be used: nitrobenzene, quinoline, glacial acetic acid, or the like; as orthodiamine there may be used: ortho-phenylene-diamine and its nuclear substitution products, naphthalene-diamine, diamino-acenaphthene or the like. The free bases as well as their free salts may be used, but it is advantageous in the latter case to add to the reaction mixture an acid binding agent such as sodium acetate or the like.

According to the present invention there are obtained as new products mixtures of isomeric dyestuffs of the probable formulæ:

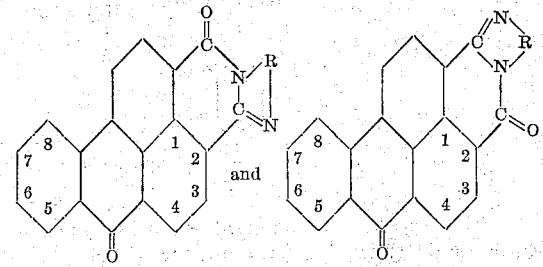

wherein the nuclei may contain substituents and a further benzene nucleus may be condensed in 5.6- or 7.8-position, the benzanthrone complexes in the molecules of the isomeric dyestuffs, however, being identical and wherein R represents an aromatic radicle which may contain substituents and which is bound in two ortho-positions to the nitrogen atoms. The products as such have an intense coloration and as vat dyestuffs they are extremely qualified for dyeing and printing purposes.

The following examples illustrate the invention, but they are not intended to limit it thereto, the parts being by weight:

(1) 30 parts of benzanthrone-peri-dicarboxylic anhydride are intimately mixed with 16 parts of ortho-phenylene diamine and the mixture is heated for a short time to about 180° C. to 200° C., while stirring. After cooling the mass is pulverized and extracted by means of hot diluted hydrochloric acid. The residue is an orange product which dissolves in sulfuric acid to a violet-red solution and dyes cotton from an alkaline hydrosulfite vat after exposure to the air orange tints of good properties as to fastness. The reaction probably proceeds in accordance with the following equation:

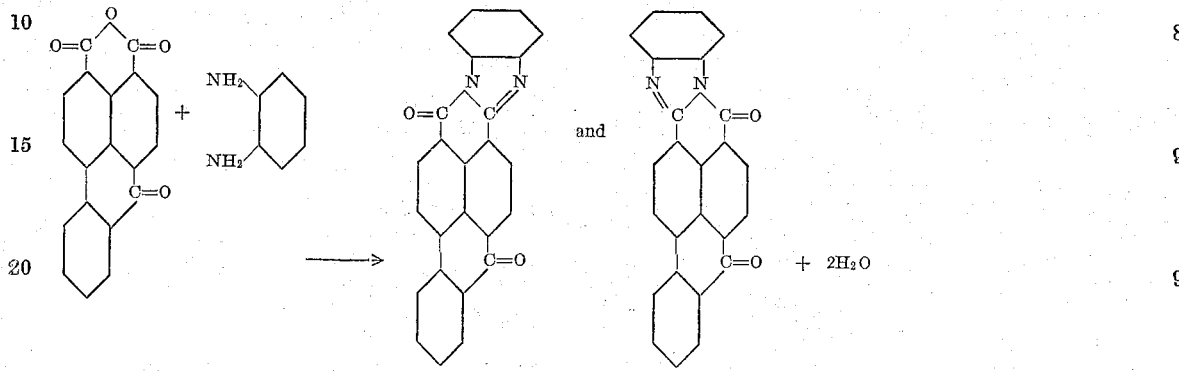

(2) 30 parts of benzanthrone-peri-dicarboxylic anhydride are mixed with 200 parts of nitrobenzene and 21.5 parts of para-chloro-orthophenylene diamine and the mixture is heated to boiling for about 30 minutes. After cooling, the dyestuff which has been precipitated is filtered with suction and washed with alcohol. It is an orange crystalline powder dissolving in concentrated sulfuric acid to a violet-red solution and dyes cotton from a red alkaline hydrosulfite vat after exposure to the air clear orange tints. The reaction probably proceeds in accordance with the following equation:

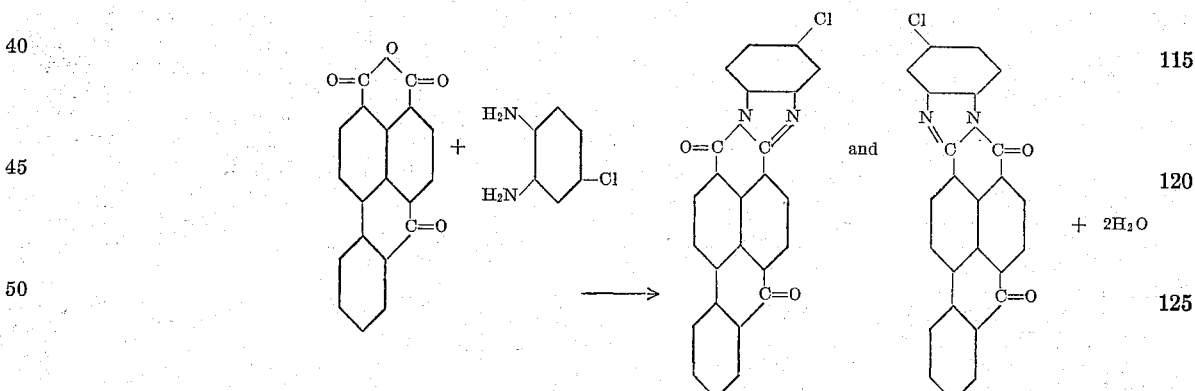

(3) 31.8 parts of benzanthrone-peri-dicarboxylic acid are heated to boiling with 200 parts of quinoline, 17 parts of para-ethoxy-orthophenylene diamine are then added thereto and the whole is further heated for about 20 minutes. After cooling, the dyestuff which has been precipitated is filtered with suction and washed first with diluted hydrochloric acid and then with water. It is a brown product which dissolves in cold sulfuric acid to a violet solution and dyes cotton from an orange-red alkaline hydrosulfite vat deep brown tints.

(4) 30 parts of benzanthrone-peri-dicarboxylic anhydride are mixed with 200 parts of quinoline and 53 parts of 1.2-naphthylene diamine sulfate. The whole is heated to boiling for about 30 minutes. After cooling, the dyestuff which has been precipitated, is filtered with suction and washed first with hot diluted hydrochloric acid and then with hot water. The residue is a brown product which dissolves in concentrated sulfuric acid to a pure blue solution and dyes cotton from the red alkaline hydrosulfite vat beautiful deep-brown tints.

(5) 33.5 parts of 7-chloro-benzanthrone-peri-dicarboxylic anhydride are mixed with 200 parts of nitrobenzene and 13 parts of ortho-phenylene diamine. The whole is heated to boiling for a short time. The dyestuff thus obtained is filtered with suction after cooling and washed with alcohol. It is an orange colored powder which dyes cotton even tints.

(6) A mixture of 15 parts of benzanthrone-peri-dicarboxylic anhydride, 7 parts of 2.3-diamino toluene and 300 parts of glacial acetic acid is heated to boiling and boiling is continued for several hours. The dyestuff is then filtered with suction, while hot, and washed with hot alcohol. The residue is boiled twice with diluted caustic soda solution and washed until neutral. The dyestuff thus obtained dyes cotton from the vat brilliant scarlet tints.

(7) A mixture of 15 parts of benzanthrone-peri-dicarboxylic anhydride, 12 parts of the hydrochloride of 2.3-diamino-5-chloro-toluene, 300 parts of glacial acetic acid and 10 parts of fused sodium acetate is heated to boiling for several hours. The reaction mixture which first has a yellow color gradually assumes a red-brown coloration. The working up is the same as that described in Example 6. The shade of the dyestuff is as clear as that obtainable according to Example 6, only a little more yellow.

(8) A mixture of 15 parts of benzanthrone-peri-dicarboxylic anhydride, 8 parts of 2-chloro-4.5-diamino-toluene, 300 parts of glacial acetic acid and 2 parts of sodium acetate is heated to boiling for several hours on the reflux apparatus. The product is worked up in the usual manner. Thus a dyestuff is obtained which dyes cotton a clear and brilliant orange tint.

(9) A mixture of 15 parts of benzanthrone-peri-dicarboxylic anhydride, 9 parts of 2-chloro- 4.5-diamino-anisol, 300 parts of glacial acetic acid and 2 parts of sodium acetate is heated to boiling for some hours. The dyestuff which is precipitated dyes cotton a clear brown tint.

(10) 15 parts of benzanthrone-peri-dicarboxylic anhydride, 9 parts of 4.5-diamino-veratrol, 300 parts of glacial acetic acid and 2 parts of sodium acetate are heated to boiling for several hours. The dyestuff thus obtained dyes cotton a blackish-brown tint.

(11) 35 parts of 5.6-benz-benzanthrone-peri-dicarboxylic anhydride (obtainable, for instance, by melting 4-α-naphthoyl-naphthalic anhydride with aluminium chloride) 11 parts of ortho-phenylene-diamine and 350 parts of glacial acetic acid are heated to boiling for some time, filtered with suction and the solid matter is washed with hot alcohol. In order to remove any unattacked dicarboxylic anhydride the mass is boiled once with diluted caustic soda solution. The dyestuff thus obtained dissolves in concentrated sulfuric acid to a red solution and dyes cotton bluish-red tints.

(12) 17.5 parts of 7.8-benz-benzanthrone-peri-dicarboxylic anhydride (obtainable, for instance, by melting 4-β-naphthoyl-naphthalic anhydride with aluminium chloride), 11.5 parts of acetate of ortho-phenylenediamine and 180 parts of nitro-benzene are heated to boiling for some time. The dyestuff which is precipitated is filtered with suction, washed with alcohol, freed from any unattacked dicarboxylic anhydride by extraction with warm dilute alkali and dried.

The dyestuff is obtained in the form of red crystals. It dyes cotton from an alkaline hydrosulfite vat bluish-red tints of very good fastness properties.

(13) 40 parts of monobromo-benzanthrone-peri-dicarboxylic anhydride (obtainable by bromination of benzanthrone-peri-dicarboxylic anhydride) are treated with 400 parts of glacial acetic acid in the ballmill so as to become very finely subdivided; to this suspension are added 25 parts of ortho-phenylene-diamine and the whole is finally heated on the reflux apparatus for half an hour, while stirring. The dyestuff which is left as residue on the filter after filtration and washing dissolves in concentrated sulfuric acid to a red-violet solution and dyes cotton from the vat red-orange tints.

We claim:

1. As new products, the mixtures of isomeric dyestuffs of the probable formulæ:

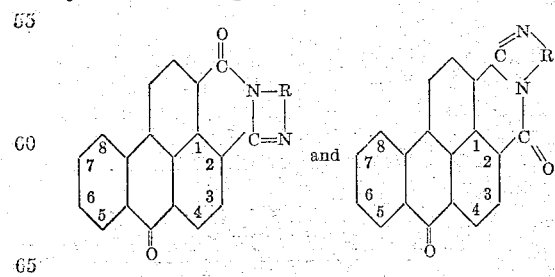

wherein the nuclei may contain halogen as substituent, and a further benzene nucleus may be condensed in 5.6- or 7.8-position, the benzanthrone complexes in the molecules of the isomeric dyestuffs, however, being identical and wherein R represents an aromatic radical of the benzene and naphthalene series which is bound in two ortho-positions to the nitrogen atoms, said products being vat dyestuffs of good fastness properties, having an intense coloration.

2. As new products, the mixtures of isomeric dyestuffs of the probable formulæ:

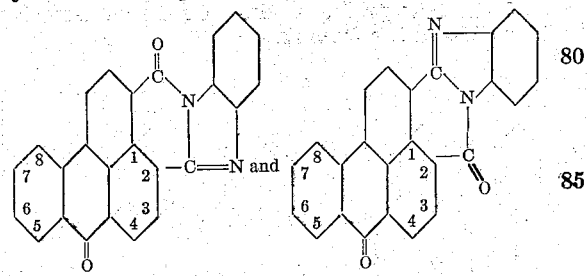

wherein the nuclei may contain halogen as substituent and a further benzene nucleus may be condensed in 5.6- or 7.8-position, the benzanthrone complexes in the molecules of the isomeric dyestuffs, however, being identical, said products being vat dyestuffs of good fastness properties, having an intense coloration.

3. As new products, the mixtures of isomeric dyestuffs of the probable formulæ:

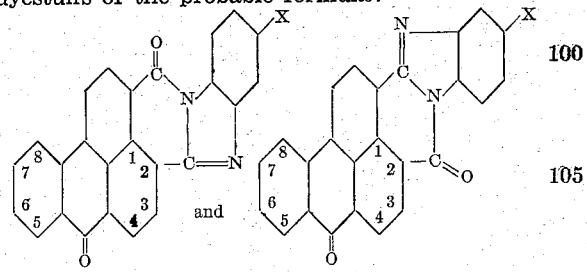

wherein a further benzene nucleus may be condensed in 5.6- or 7.8-position, the benzanthrone complexes in the molecules of the isomeric dyestuffs, however, being identical and wherein X represents hydrogen or chlorine, said products being vat dyestuffs of good fastness properties, having an intense coloration.

4. As new products, the mixtures of isomeric dyestuffs of the formulæ:

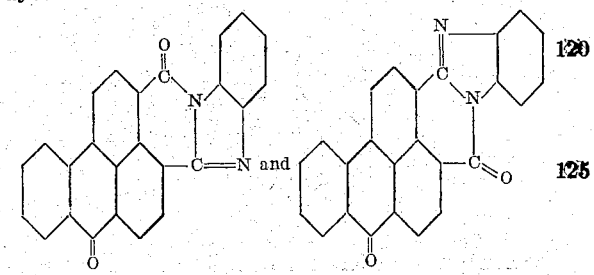

being orange products, dissolving in sulfuric acid to a violet-red solution and dyeing cotton from an alkaline hydrosulfite vat after exposure to the air orange tints of good fastness properties.

5. As new products, the mixtures of isomeric dyestuffs of the probable formulæ:

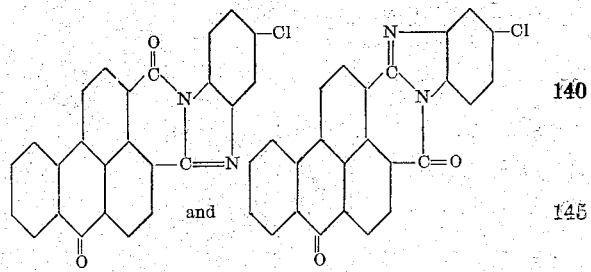

said products being orange, crystalline powders, dissolving in concentrated sulfuric acid to a violet-red solution and dyeing cotton from a red alkaline hydrosulfite vat after exposure to the air clear orange tints.

6. As new products, the mixture of isomeric dyestuffs of the formulæ:

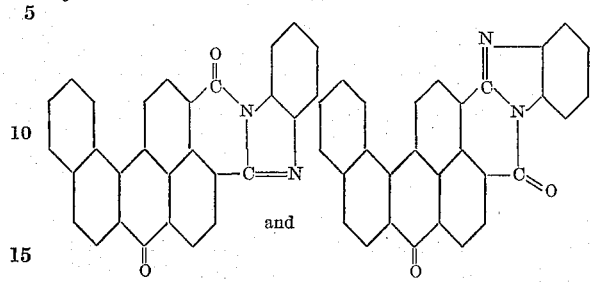

and said products being red crystals, dyeing cotton from an alkaline hydrosulfite vat bluish-red tints of very good fastness properties.

7. The process which comprises condensing an aromatic ortho-diamine with a benzanthrone-peri-dicarboxylic anhydride of the following general formula:

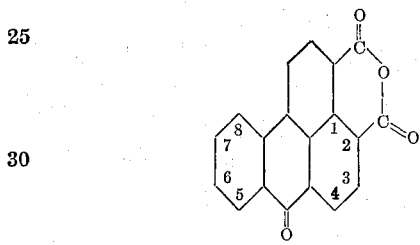

wherein the nuclei may contain halogen as substituent and a further benzene nucleus may be condensed in 5.6- or 7.8-position, by heating to a temperature exceeding 80° C. up to the boiling or melting temperature of the reaction mixture.

8. The process which comprises condensing in the presence of a diluent an aromatic ortho-diamine with a benzanthrone-peri-dicarboxylic anhydride of the following general formula:

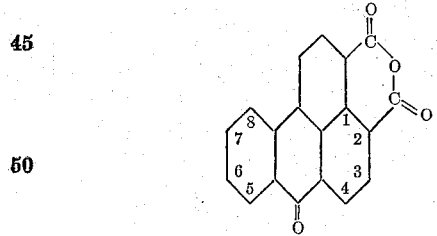

wherein the nuclei may contain halogen as substituent and a further benzene nucleus may be condensed in 5.6- or 7.8-position, by heating to a temperature exceeding 80° C. up to the boiling or melting temperature of the reaction mixture.

9. The process which comprises condensing an aromatic ortho-diamine of the benzene series with a benzanthrone-peri-dicarboxylic anhydride of the following general formula

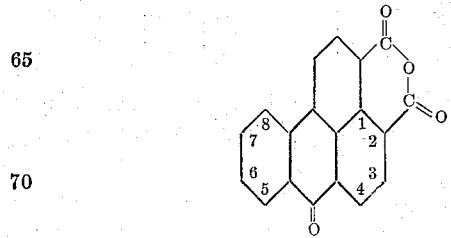

wherein a further benzene nucleus may be condensed in 5.6- or 7.8-position, by heating to a temperature exceeding 80° C. up to the boiling or melting temperature of the reaction mixture.

10. The process which comprises condensing in the presence of a diluent an aromatic ortho-diamine of the benzene series with a benzanthrone-peri-dicarboxylic anhydride of the following general formula

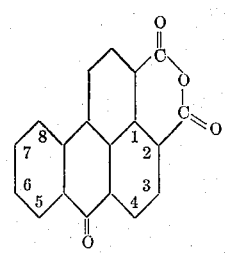

wherein a further benzene nucleus may be condensed in 5.6- or 7.8-position, by heating to a temperature exceeding 80° C. up to the boiling or melting temperature of the reaction mixture.

11. The process which comprises condensing ortho-phenylene diamine with benzanthrone-peri-dicarboxylic anhydride by heating the components for a short time to about 180° C. to 200° C. while stirring.

12. The process which comprises condensing para-chloro-ortho-phenylene diamine with benzanthrone-peri-dicarboxylic anhydride in the presence of nitrobenzene by heating the mixture to boiling for about 30 minutes.

13. The process which comprises condensing the acetate of ortho-phenylene diamine with 7.8-benzo-benzanthrone-peri-dicarboxylic anhydride in the presence of nitrobenzene by heating the mixture to boiling for some time.

14. As new products, the mixtures of isomeric dyestuffs which are obtainable by the process which comprises condensing an aromatic ortho-diamine with a benzanthrone-peri-dicarboxylic anhydride of the following general formula:

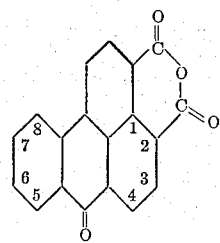

wherein the nuclei may contain halogen as substituent, and a further benzene nucleus may be condensed in 5.6- or 7.8-position, by heating to a temperature exceeding 80° C. up to the boiling or melting temperature of the reaction mixture.

GEORG KRÄNZLEIN.
HEINRICH GREUNE.
MARTIN CORELL.
HEINRICH VOLLMANN.